(12) United States Patent
Hare et al.

(10) Patent No.: US 10,688,637 B2
(45) Date of Patent: Jun. 23, 2020

(54) METHOD AND TOOL FOR REMOVING A TAPERED SLEEVE BOLT FROM A COMPONENT

(71) Applicant: THE BOEING COMPANY, Chicago, IL (US)

(72) Inventors: John Richard Hare, Langley, WA (US); Jeffrey Wayne Hamilton, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 342 days.

(21) Appl. No.: 15/439,280

(22) Filed: Feb. 22, 2017

(65) Prior Publication Data

US 2018/0236644 A1    Aug. 23, 2018

(51) Int. Cl.
| | |
|---|---|
| *B23P 19/04* | (2006.01) |
| *B25B 27/06* | (2006.01) |
| *F16B 19/02* | (2006.01) |
| *B25B 27/02* | (2006.01) |

(52) U.S. Cl.
CPC .............. *B25B 27/06* (2013.01); *B25B 27/02* (2013.01); *F16B 19/02* (2013.01)

(58) Field of Classification Search
USPC ........................................ 29/255, 256, 243.5
See application file for complete search history.

(56) References Cited

U.S. PATENT DOCUMENTS

| | | | | |
|---|---|---|---|---|
| 3,298,725 A | * | 1/1967 | Boteler | B61F 5/26<br>403/282 |
| 3,322,449 A | * | 5/1967 | Becker | F16B 19/1072<br>29/509 |
| 3,735,650 A | * | 5/1973 | Weng, Jr. | B25B 27/18<br>81/53.2 |
| 4,087,896 A | * | 5/1978 | Salter | F16B 5/02<br>29/256 |
| 4,102,036 A | | 7/1978 | Salter | |

(Continued)

FOREIGN PATENT DOCUMENTS

EP    3333904 A1    6/2018

OTHER PUBLICATIONS

Extended European Search Report and Written Opinion for corresponding EP Application No. 17203831.7-1019 dated Jun. 14, 2018 (54 pages).

*Primary Examiner* — Joseph J Hail
*Assistant Examiner* — Shantese L McDonald
(74) *Attorney, Agent, or Firm* — The Small Patent Law Group LLC; Jay J. Hoette

(57) ABSTRACT

A tapered sleeve bolt removal tool for removing a tapered sleeve bolt includes a stop sleeve configured to be coupled to a threaded end of a bolt of the tapered sleeve bolt. The stop sleeve has a stop shoulder configured to abut against a bottom of a sleeve of the tapered sleeve bolt. The stop sleeve has a lateral dimension less than or equal to a lateral dimension of the sleeve to allow the stop sleeve to be removed through an opening with the bolt and the sleeve. A bolt extractor having a bolt engagement feature is configured to engage an extraction shoulder of the bolt. The bolt extractor is pulled in an extraction direction to pull the bolt, the stop sleeve and the sleeve to simultaneously remove the sleeve and the bolt from the opening in the component.

20 Claims, 4 Drawing Sheets

(56) References Cited

U.S. PATENT DOCUMENTS

| | | | |
|---|---|---|---|
| 4,651,596 A * | 3/1987 | Rachanski | B25B 13/44 29/264 |
| 4,702,658 A | 10/1987 | Salter | |
| 4,724,608 A * | 2/1988 | Parrott | B25B 27/023 29/253 |
| 7,874,777 B1 | 1/2011 | Howie, Jr. | |
| 8,978,221 B1 | 3/2015 | Somerville et al. | |
| 9,056,359 B1 | 6/2015 | Clark et al. | |
| 2010/0196119 A1* | 8/2010 | Miyagawa | F16B 41/002 411/372.5 |
| 2013/0327189 A1* | 12/2013 | Wagstaff | B25B 27/18 81/463 |

* cited by examiner

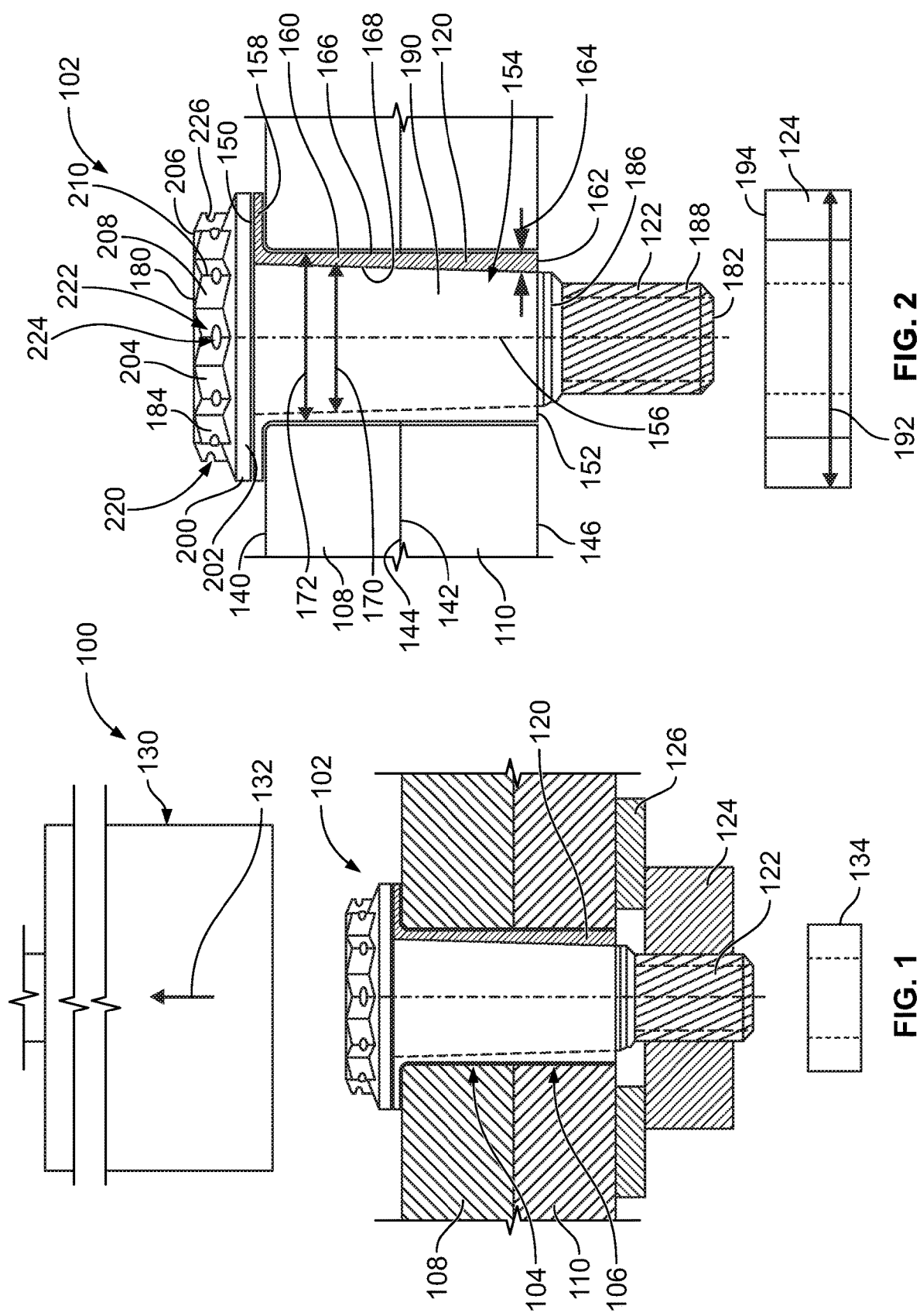

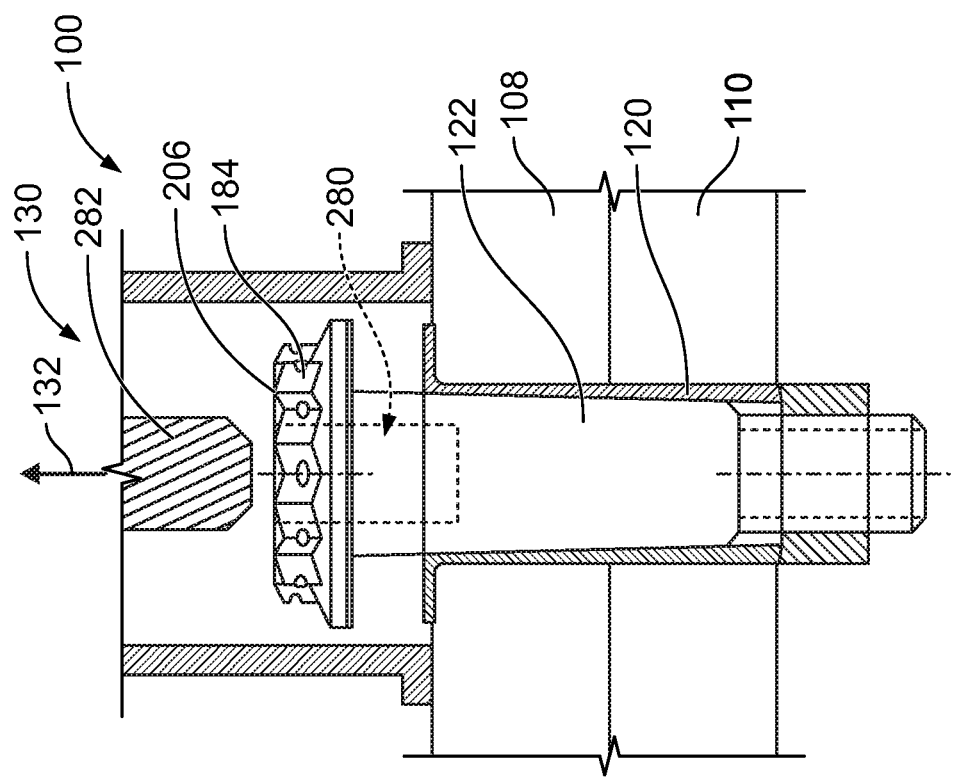
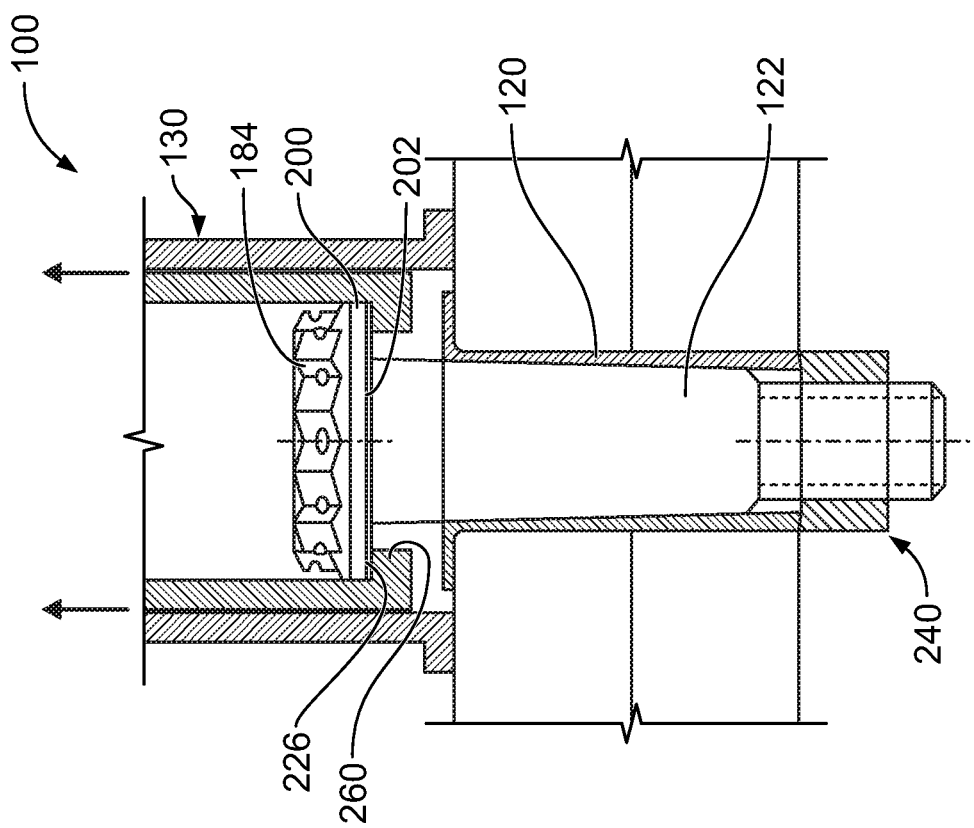

METHOD AND TOOL FOR REMOVING A TAPERED SLEEVE BOLT FROM A COMPONENT

BACKGROUND

The present disclosure relates generally to methods and tools for removing a tapered sleeve bolt from a component.

Tapered sleeve bolts are used in various applications, such as in aircraft manufacturing, for holding components together. For example, the tapered sleeve bolts may be used to join together panels, structural members, structural ribs, aircraft skins and the like. The tapered sleeve bolts are received in openings in the components and secured using a nut to hold the components together. In various applications, the tapered sleeve bolt includes a sleeve having a tapered bore and a bolt received in the tapered bore. The bolt has a threaded end and the nut is threadably coupled to the threaded end to sandwich the components between a flange of the sleeve and the nut.

However, in certain situations, the tapered sleeve bolts may need to be removed. For instance, if parts of the tapered sleeve bolt are damaged or if parts of one or more of the components are damaged, the tapered sleeve bolts may need to be removed to replace the damaged part. Removal of the tapered sleeve bolt is a time consuming process and has the potential of damaging the components during removal. For instance, removal of the tapered sleeve bolt is a two-step process of first removing the bolt and second removing the sleeve using different tools. Typically, the bolt is removed using an impact device on the bottom end and/or against the head to drive the bolt out of the sleeve. Removal using impact methods is undesirable due to the potential of damaging and/or de-laminating the components. The sleeve is then removed in a separate operation with specialized and expensive tooling. Conventional sleeve removal tooling requires the purchase and maintenance of hundreds of separate tools corresponding to different diameter and different length sleeve combinations for extraction of the various sleeves.

Therefore, it would be advantageous to have a method and tool for removal of a tapered sleeve bolt from a component in a cost effective and reliable manner.

SUMMARY

In accordance with one embodiment, a tapered sleeve bolt removal tool is provided for removing a tapered sleeve bolt including a sleeve configured to be received in an opening in a component that includes a tapered bore and a bolt received in the tapered bore including a head and a threaded end extending below a bottom of the sleeve for receiving a nut to secure the tapered sleeve bolt to the component. The tapered sleeve bolt removal tool includes a stop sleeve configured to be coupled to the threaded end of the bolt. The stop sleeve has a stop shoulder configured to abut against the bottom of the sleeve. The stop sleeve has a lateral dimension less than or equal to a lateral dimension of the sleeve to allow the stop sleeve to be removed through the opening in the component with the bolt and the sleeve. The tapered sleeve bolt removal tool includes a bolt extractor having a bolt engagement feature configured to engage an extraction shoulder of the bolt. The bolt extractor is pulled in an extraction direction to pull the bolt out of the component. The stop sleeve is pulled with the bolt by the bolt extractor in the extraction direction against the bottom of the sleeve to simultaneously remove the sleeve and the bolt from the opening in the component.

In accordance with another embodiment, a tapered sleeve bolt assembly is provided including a sleeve having a top and a bottom and having a tapered bore extending along a longitudinal axis between the top and the bottom with a flange at the top. The sleeve is configured to be received in an opening in a component and has a lateral dimension at the bottom sized to allow insertion of the sleeve into and removal of the sleeve from the opening. A bolt is received in the tapered bore. The bolt has a top and a bottom with a head at the top and a threaded end at the bottom. The threaded end extends below the bottom of the sleeve for receiving a nut to secure the tapered sleeve bolt assembly to the component. The bolt has an extraction shoulder accessible from above the bolt configured to be engaged by a tapered sleeve bolt removal tool for extracting the tapered sleeve bolt assembly. A stop sleeve is coupled to the threaded end of the bolt for removing the sleeve from the component. The stop sleeve has a stop shoulder configured to abut against the bottom of the sleeve. The stop sleeve has a lateral dimension less than or equal to the lateral dimension of the sleeve to allow the stop sleeve to be removed through the opening in the component with the bolt and the sleeve by the tapered sleeve bolt removal tool.

In accordance with a further embodiment, a method is provided for removing a tapered sleeve bolt from an opening in a component that includes a sleeve having a tapered bore and a bolt received in the tapered bore including a head and a threaded end extending below a bottom of the sleeve for receiving a nut to secure the tapered sleeve bolt to the component. The method includes coupling a stop sleeve to the threaded end of the bolt such that a stop shoulder of the stop sleeve faces the bottom of the sleeve, attaching a bolt extractor to the bolt such that a bolt engagement feature of the bolt extractor engages an extraction shoulder of the bolt, and pulling the bolt extractor in an extraction direction to pull the bolt out of the component. The bolt extractor forces the stop shoulder of the stop sleeve against the bottom of the sleeve such that the sleeve is removed simultaneously with the bolt by the stop sleeve as the bolt extractor pulls the bolt in the extraction direction.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 1 is a schematic view of a tapered sleeve bolt removal tool in accordance with an exemplary embodiment.

FIG. 2 is a partial sectional view of a tapered sleeve bolt in accordance with an exemplary embodiment received in components.

FIG. 5 is a partial sectional view of the tapered sleeve bolt removal tool in accordance with an exemplary embodiment.

FIG. 6 is a partial sectional view of the tapered sleeve bolt removal tool in accordance with an exemplary embodiment.

DETAILED DESCRIPTION

Figure 3:
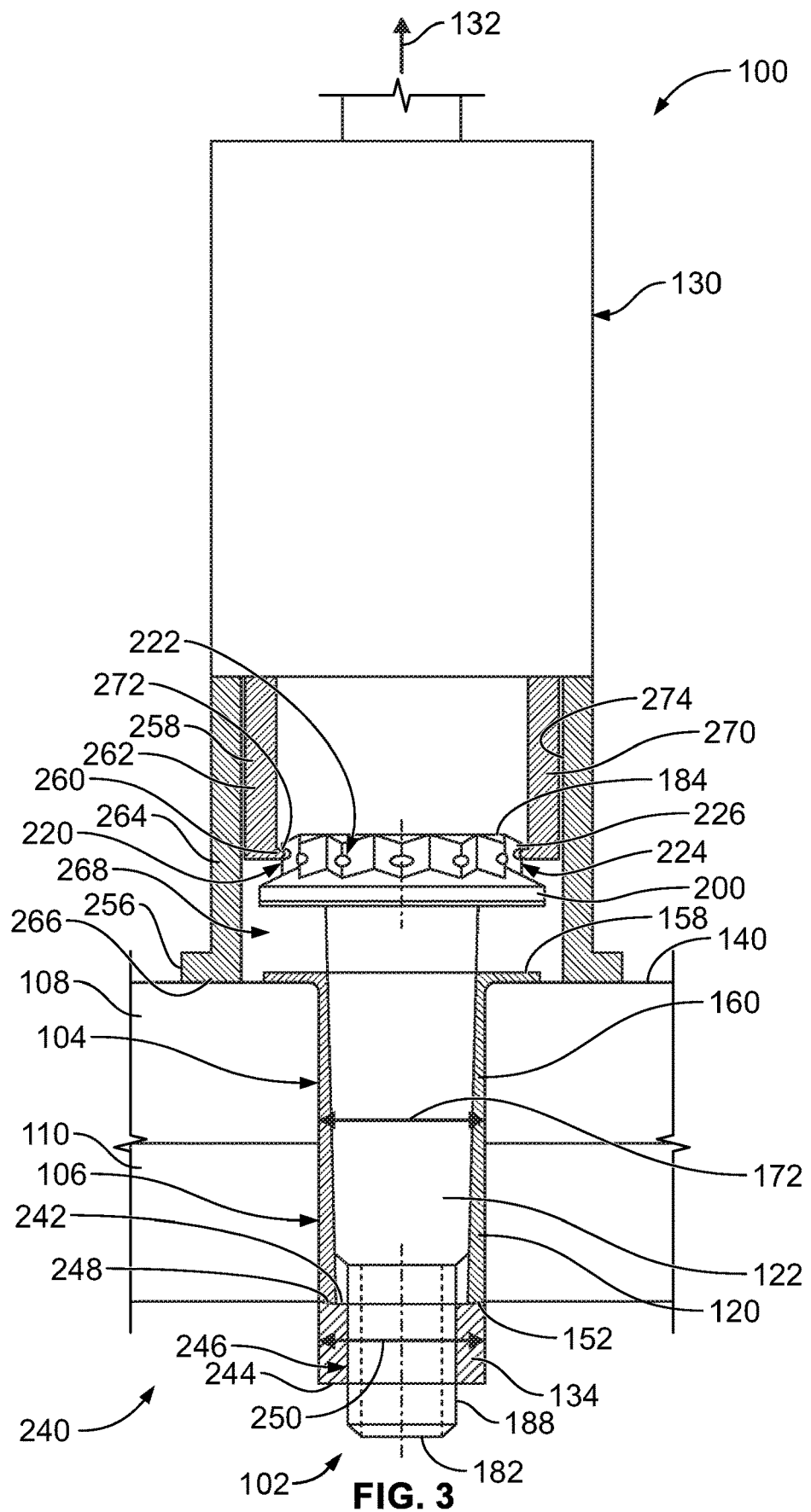
FIG. 3 is a partial sectional view of the tapered sleeve bolt removal tool removing the tapered sleeve bolt from openings in the components.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic view of a tapered sleeve bolt removal tool 100 in accordance with an exemplary embodiment. The tapered sleeve bolt removal tool 100, sometimes referred to simply as the removal tool 100, is used to remove a tapered sleeve bolt 102 from openings 104, 106 in corresponding components 108, 110. The tapered sleeve bolt 102 is received in the openings 104, 106 to secure the components 108, 110 together. The components 108, 110 may be any type of components 108, 110, such as components of an aircraft. For example, the components 108, 110 may be panels, structural supports, structural ribs, skins, and the like. The components 108, 110 may be parts of the wing, the fuselage or other parts of the aircraft. The components 108, 110 may be composite parts, such as carbon fiber reinforced plastic parts, metal parts or other types of parts. The subject matter herein is not intended to be limited to aircraft parts, but rather may be used in other applications that utilize tapered sleeve bolts. In some circumstances, the tapered sleeve bolt 102 needs to be removed from the components 108, 110, such as for repair, replacement, inspection or for other purposes. The removal tool 100 is used to remove the tapered sleeve bolt 102 during an extraction or removal process.

In an exemplary embodiment, the tapered sleeve bolt 102 includes a sleeve 120, a bolt 122 received in the sleeve 120 and a nut 124 used to secure the bolt 122 in the sleeve 120. The nut 124 is threadably coupled to the bolt 122 and tightened to secure the components 108, 110 together. Optionally, a washer 126 or other component may be coupled to the bolt 122 above the nut 124 to engage the component 110. For removal of the tapered sleeve bolt 102, the nut 124 is loosened and removed from the bolt 122. After the nut 124 is removed, the removal tool 100 removes the bolt 122 and the sleeve 120 together as a unit from above the components 108, 110. In an exemplary embodiment, the bolt 122 is used to remove the sleeve 120 from the openings 104, 106 and the components 108, 110. For example, the removal tool 100 pulls upward on the bolt 122 to pull the sleeve 120 out of the components 108, 110.

In an exemplary embodiment, the tapered sleeve bolt removal tool 100 includes a bolt extractor 130 configured to engage the bolt 122 and pull the bolt 122 in an extraction direction 132 (for example, upward) and a stop sleeve 134 configured to be coupled to the bolt 122 and engage the sleeve 120 as the bolt 122 is pulled in the extraction direction 132. In an exemplary embodiment, the stop sleeve 134 is coupled to the bolt 122 below the sleeve 120. For example, the stop sleeve 134 is coupled to the bolt 122 in place of the nut 124 after the nut 124 is removed from the bolt 122. As the bolt 122 is pulled in the extraction direction 132, the stop sleeve 134 is pulled in the extraction direction 132 until the stop sleeve 134 engages the bottom of the sleeve 120. The stop sleeve 134 and the sleeve 120 are pulled through the openings 104, 106 of the components 108, 110 with the bolt 122 by the bolt extractor 130. As such, the bolt extractor 130 simultaneously removes the bolt 122 and the sleeve 120 in the same motion and process and using the same tool.

FIG. 2 is a partial sectional view of the tapered sleeve bolt 102 in accordance with an exemplary embodiment received in the components 108, 110. The component 108 includes a top surface 140 and a bottom surface 142 with the opening 104 extending therethrough. The component 110 includes a top surface 144 and a bottom surface 146 with the opening 106 extending therethrough. The tapered sleeve bolt 102 is used to hold the components 108, 110 together. When the nut 124 is tightened to the bolt 122, the top surface 144 of the component 110 is forced against and abuts the bottom surface 142 of the component 108. The nut 124 may directly engage the bottom surface 146 of the component 110 (or the washer 126 may be provided therebetween) and the sleeve 120 may directly engage the top surface 140 of the component 108 to press the components 108, 110 together.

The sleeve 120 extends between a top 150 and a bottom 152. The sleeve 120 has a tapered bore 154 extending along a longitudinal axis 156 between the top 150 and the bottom 152. The sleeve 120 has a flange 158 at the top 150 configured to engage the top surface 140 of the component 108. The sleeve 120 has a shaft 160 extending below the flange 158. The shaft 160 of the sleeve 120 is configured to be received in the openings 104, 106 in the components 108, 110.

The shaft 160 is defined by a wall 162 having a thickness 164 between an exterior surface 166 and an interior surface 168. The interior surface 168 defines the tapered bore 154. The exterior surface 166 faces the components 108, 110 in the openings 104, 106. In an exemplary embodiment, the interior surface 168 has a variable inner lateral dimension 170 along the length such that the tapered bore 154 is tapered. For example, the tapered bore 154 is wider near the top 150 and narrower near the bottom 152. Optionally, the thickness 164 may be variable along the length of the shaft 160 with the wall 162 being thinner near the top 150 and thicker near the bottom 152 to define the taper of the tapered bore 154. In an exemplary embodiment, the exterior surface 166 has a uniform outer lateral dimension 172 such that the outer lateral dimension 172 is the same near the top 150 as the bottom 152. The outer lateral dimension 172 at the bottom 152 is sized to allow insertion of the sleeve 120 into and removal of the sleeve 120 from the openings 104, 106. For example, the outer lateral dimension 172 may be sized and shaped such that the sleeve 120 fits snugly, such as by an interference fit, in the openings 104, 106. Optionally, the wall 162 may have a generally circular cross-section such that the inner lateral dimension 170 is an inner diameter and the outer lateral dimension 172 is an outer diameter; however, the wall 162 may have other shapes in alternative embodiments.

The bolt 122 is received in the tapered bore 154. The bolt 122 has a top 180 and a bottom 182. The bolt 122 has a head 184 at the top 180 and a shaft 186 extending below the head 184. The shaft 186 has a threaded end 188 at the bottom 182. The shaft 186 is received in the tapered bore 154. In an exemplary embodiment, the shaft 186 has a tapered body 190 that matches the tapered shape of the tapered bore 154. The shaft 186 may fit snugly, such as by an interference fit, in the tapered bore 154 of the sleeve 120.

In an exemplary embodiment, the threaded end 188 extends below the bottom 152 of the sleeve 120 and the bottom surface 146 of the component 110 for receiving the nut 124. In various embodiments, the nut 124 is threadably coupled to the threaded end 188. For example, the nut 124 includes internal threads that may be threadably coupled to the threaded end 188. Optionally, the nut 124 may be a hex nut having a series of flat sides used for tightening the nut 124 or untightening the nut 124 to the threaded end 188 of the bolt 122. The nut 124 has a lateral dimension 192 larger than the outer lateral dimension 172 of the sleeve 120. As such, the nut 124 is wider than the sleeve 120 at the bottom 152. The nut 124 has an abutment surface 194 at the top of the nut 124 configured to abut against the bottom surface 146 of the component 110, or to another component such as the washer 126 (shown in FIG. 1), to capture the components 108, 110 between the nut 124 and the flange 158 of the sleeve 120. The lateral dimension 192 of the nut 124 is wider than the openings 104, 106 such that the nut 124 cannot be pulled through the openings 104, 106. Rather, the nut 124 engages the bottom surface 146 to block pulling of the nut 124 through the openings 104, 106.

The head 184 is positioned above the sleeve 120. In an exemplary embodiment, the head 184 includes a flange 200 at a bottom surface 202 of the head 184. The flange 200 is configured to be seated against the top of the flange 158 of the sleeve 120. The head 184 includes wrenching features 204 at a top 206 of the head 184. The wrenching features 204 may be used for tightening of the bolt 122 with the nut 124. In an exemplary embodiment, the wrenching features 204 include a plurality of flats 208 meeting at corners 210. Other types of wrenching features 204 may be provided in alternative embodiments. In various embodiments, the wrenching features 204 may form a hexagonal shaped. In other various embodiments, the wrenching features 204 may form other shapes having a different number of sides. Optionally, the wrenching features 204 may form a gear shape having a plurality of triangular features defined by the flats 208 and the corners 210 circumscribing the head 184.

In an exemplary embodiment, the head 184 includes one or more extraction features 220 used for extracting the bolt 122 during an extraction process, such as using the tapered sleeve bolt removal tool 100 (shown in FIG. 1). The extraction features 220 are configured to be engaged by the tapered sleeve bolt removal tool 100 and allow the tapered sleeve bolt removal tool 100 to pull upward on the bolt 122 to move the bolt 122 in the extraction direction 132, such as parallel to the longitudinal axis 156. In the illustrated embodiment, the extraction features 220 are defined by grooves 222 formed in the head 184. For example, the grooves 222 are formed in one or more of the flats 208, such as at the corners 210. The grooves 222 define spaces or cavities 224 that may receive portions of the tapered sleeve bolt removal tool 100 and extraction shoulders 226 configured to be engaged by the tapered sleeve bolt removal tool 100 and provide a surface for pulling upward on the bolt 122. The extraction shoulders 226 face generally downward. Other types of extraction features 220 may be used in alternative embodiments. The extraction features 220 may be provided on other portions of the head 184 of the bolt 122 in other various embodiments, such as below the flange 200 or inside the head 184, such as a threaded bore formed in the head 184. In an exemplary embodiment, the extraction features 220 are accessible from above the bolt 122 such that the tapered sleeve bolt removal tool 100 may be connected to the tapered sleeve bolt 102 from above the bolt 122.

FIG. 3 is a partial sectional view of the tapered sleeve bolt removal tool 100 removing the tapered sleeve bolt 102 from the openings 104, 106 in the components 108, 110. As noted above, during removal, the nut 124 (shown in FIG. 2) is removed from the bolt 122. The stop sleeve 134 is coupled to the threaded end 188 of the bolt 122 and is used in conjunction with the bolt extractor 130 to remove the sleeve 120 with the bolt 122 as the bolt 122 is removed by the bolt extractor 130. The stop sleeve 134 is configured to be axially fixed along the bolt 122 and pulled tight against the bottom 152 of the sleeve 120 as the bolt 122 is extracted by the tapered sleeve bolt removal tool 100. When the stop sleeve 134 is attached to the tapered sleeve bolt 102, the combined structure forms a tapered sleeve bolt assembly 240. The removal tool 100 is used to remove the tapered sleeve bolt assembly 240 from the components 108, 110 as a single structure. For example, the bolt extractor 130 pulls the bolt 122, the stop sleeve 134 and the sleeve 120 upward out of the openings 104, 106 as the bolt extractor 130 is moved in the extraction direction 132.

The stop sleeve 134 includes a top 242, a bottom 244 and a bore 246 extending therethrough. In an exemplary embodiment, the bore 246 is threaded such that the stop sleeve 134 is configured to be threadably coupled to the threaded end 188 of the bolt 122. The stop sleeve 134 may be coupled to the bolt 122 by other means other than being threadably coupled. For example, the stop sleeve 134 may be coupled to the bolt 122 using a pin, a clip, or other type of fastener. In other alternative embodiments, rather than fitting over the threaded end 188 of the bolt 122, the stop sleeve 134 may be coupled to the bottom 182 of the bolt 122. For example, the bolt 122 may include an internal chamber that receives a portion of the stop sleeve 134. For example, the stop sleeve 134 may include a threaded lug at the top 242 that is received in the internal chamber of the bolt 122 and coupled thereto, such as being threadably coupled to the internal chamber of the bolt 122 at the bottom 182.

The stop sleeve 134 has a stop shoulder 248 at the top 242 configured to engage the bottom 152 of the sleeve 120. As the bolt 122 is pulled upward, the stop shoulder 248 engages the bottom 152 to pull the sleeve 120 upward with the bolt 122 and urge the sleeve 120 out of the openings 104, 106 during the extraction process. As such, the bolt 122 and the sleeve 120 are pulled out of the components 108, 110 in one operation using the same removal tool 100. In an exemplary embodiment, the stop sleeve 134 has a lateral dimension 250 that is less than or equal to the outer lateral dimension 172 of the shaft 160 of the sleeve 120 and is greater than an inside diameter of the sleeve 120. For example, the lateral dimension 250 may be a diameter less than or equal to an outer diameter of the shaft 160 of the sleeve 120. As such, the stop sleeve 134 is sized to fit through the openings 104, 106 as the tapered sleeve bolt assembly 240 is removed from the components 108, 110. The stop sleeve 134 passes through the openings 104, 106 of the components 108, 110 as the removal tool 100 extracts the bolt 122 and the sleeve 120. The lateral dimension 250 of the stop sleeve 134 is narrower than the lateral dimension 192 (shown in FIG. 2) of the nut 124, and as such, the stop sleeve 134 is not used to retain the tapered sleeve bolt 102 on the components 108, 110 as the nut 124 is used, but rather is configured to pass through the components 108, 110 during extraction to remove the sleeve 120 with the bolt 122.

In various embodiments, the stop sleeve 134 may be attached to the bolt 122 at a position that allows the bolt 122 to be partially extracted from the sleeve 120 before the stop shoulder 248 engages the bottom 152 of the sleeve 120. The flange 200 of the head 184 may be lifted a distance from the flange 158 of the sleeve 120 before the stop shoulder 248 engages the sleeve 120 and starts to extract the sleeve 120 with the bolt 122. Optionally, the bolt 122 may be driven upward the distance to create an impact by the stop sleeve 134 against the bottom 152 of the sleeve 120 to jar the sleeve 120 loose from the components 108, 110. Optionally, the bolt 122 may be lowered and raised repeatedly to impact and loosen the sleeve 120 prior to extraction. In other various embodiments, the bolt 122 may be lifted upward the distance to allow the removal tool 100 to interact with the extraction features 220. For example, in various embodiments, extraction features 220 may be provided below the flange 200 and lifting the bolt 122 of the distance allows the removal tool 100 to be received under the extraction features 220 prior to the bolt extractor 130 being used to extract the bolt 122.

The bolt extractor 130 is configured to engage the bolt 122 and pull the bolt 122, and thus the sleeve 120 via the stop sleeve 134, in the extraction direction 132 (for example, upward). The bolt extractor 130 includes a base 256 configured to be mounted to the top surface 140 of the component 108 and a movable member 258 movable relative to the base 256 to pull the bolt 122 upward during the extraction process. The base 256 of the bolt extractor 130 braces against the component 108 during the extraction process. The bolt extractor 130 has a bolt engagement feature 260 configured to engage the corresponding extraction feature 220 of the bolt 122. For example, the bolt engagement feature 260 engages the extraction shoulder 226 of the bolt 122 to lift the bolt 122 upward. The bolt extractor 130 is pulled in the extraction direction 132 to pull the bolt 122 and the sleeve 120 out of the components 108, 110 from above the components 108, 110. For example, the stop sleeve 134 is pulled with the bolt 122 by the bolt extractor 130 in the extraction direction 132 against the bottom 152 of the sleeve 120 to simultaneously remove the sleeve 120 and the bolt 122 from the openings 104, 106 from above the components 108, 110. The sleeve 120 does not need to be independently removed from the components 108, 110 after the bolt 122 is removed. Rather, the bolt 122 and the sleeve 120 are removed in a single extraction movement.

In various embodiments, the bolt extractor 130 includes an inner housing 262 and an outer housing 264 radially outward of the inner housing 262. In the illustrated embodiment, the inner housing 262 includes or is defined by the movable member 258 and the outer housing 264 includes or is defined by the base 256. In various embodiments, the outer housing 264 may be a cylindrical shell surrounding the inner housing 262 and the inner housing 262 may be movable relative to the outer housing 264. For example, the inner housing 262 may be pulled or otherwise forced upward relative to the outer housing 264 during the extraction process, such as by a hydraulic piston, a pneumatic piston, an electrically actuated lead screw, or by another device. In other various embodiments, the inner housing 262 may be manually actuated such as by pulling the movable member 258 upward relative to the base 256. In various embodiments, the inner housing 262 may be threadably coupled to the outer housing 264 such that rotation of the inner housing 262 or the outer housing 264 relative to the other causes linear movement of the inner housing 262 relative to the outer housing 264.

In an exemplary embodiment, the outer housing 264 includes a bottom 266 defining the base 256 configured to be mounted to the top surface 140 of the component 108. The base 256 may remain supported by the top surface 140 of the component 108 during the extraction process as the inner housing 262 is pulled upward relative to the outer housing 264. The outer housing 264 includes a chamber 268 housing the inner housing 262. The inner housing 262 is movable within the chamber 268. The outer housing 264 is mounted to the component 108 above the tapered sleeve bolt assembly 240 such that the tapered sleeve bolt assembly 240 is configured to be pulled into the chamber 268 as the tapered sleeve bolt assembly 240 is extracted from the components 108, 110.

In an exemplary embodiment, the inner housing 262 includes the bolt engagement features 260 configured to be operably coupled to the extraction features 220. In various embodiments, the bolt engagement features 260 are provided at ends of tabs or fingers 270 configured to be received under the extraction shoulders 226. For example, the fingers 270 may be received in the corresponding cavities 224 defined by the grooves 222 such that engagement surfaces 272 of the bolt engagement features 260 engage the extraction shoulders 226. As the inner housing 262 is pulled upward, the engagement surfaces 272 lift the bolt 122 upward by the extraction shoulders 226. Optionally, the fingers 270 may be deflectable and may snap into engaged positions with the extraction features 220. In an exemplary embodiment, the outer housing 264 of the bolt extractor 130 includes one or more side walls 274 radially outward of the fingers 270 for retaining the fingers 270 in position relative to the extraction shoulders 226.

In an exemplary embodiment, a method for removing the tapered sleeve bolt 102 from the openings 104, 106 in the components 108, 110 includes coupling the stop sleeve 134 to the threaded end 188 of the bolt 122 such that the stop shoulder 248 of the stop sleeve 134 faces the bottom 152 of the sleeve 120. The method includes attaching the bolt extractor 130 to the bolt 122 from above the component 108 such that the bolt engagement feature 260 of the bolt extractor 130 engages the extraction shoulder 226 of the bolt 122. The method includes pulling the bolt extractor 130 in the extraction direction 132 to pull the bolt 122 out of the components 108, 110 from above the components 108, 110. The bolt extractor 130 forces the stop shoulder 248 of the stop sleeve 134 against the bottom 152 of the sleeve 120 such that the sleeve 120 is removed simultaneously with the bolt 122 by the stop sleeve 134 as the bolt extractor 130 pulls the bolt 122 in the extraction direction 132.

Figure 4:
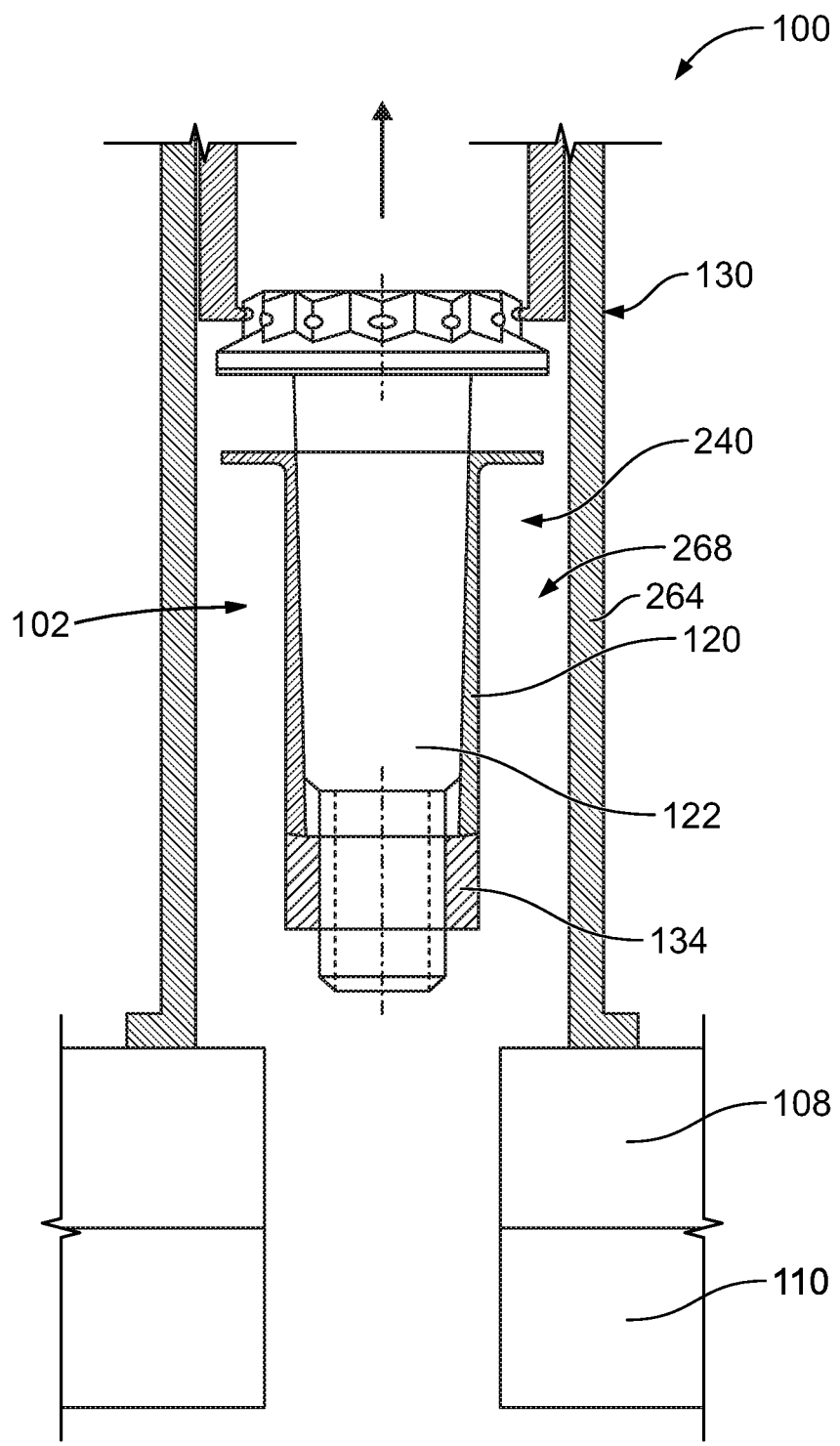
FIG. 4 is a partial sectional view of the tapered sleeve bolt removal tool with the tapered sleeve bolt assembly removed from the components.

FIG. 4 is a partial sectional view of the tapered sleeve bolt removal tool 100 with the tapered sleeve bolt assembly 240 removed from the components 108, 110. The bolt extractor 130 extracts the sleeve 120 with the bolt 122 using the stop sleeve 134. In the illustrated embodiment, the bolt extractor 130 pulls the tapered sleeve bolt assembly 240 into the chamber 268 of the outer housing 264 of the bolt extractor 130. All of the removal forces are applied to the bolt 122 from above the components 108, 110. A separate sleeve removal device is not necessary. The sleeve 120 does not need to be driven out of the components 108, 110 separate from the bolt 122. The tapered sleeve bolt removal tool 100 removes both the sleeve 120 and the bolt 122 quickly and efficiently with a reduced risk of damage to the components 108, 110 as compared to conventional bolt removal tools and sleeve removal tools.

FIG. 5 is a partial sectional view of the tapered sleeve bolt removal tool 100 in accordance with an exemplary embodiment. In the illustrated embodiment, the bolt extractor 130 engages a different portion of the bolt 122. For example, the bolt engagement features 260 engage the bolt 122 under the flange 200 of the head 184. The extraction shoulders 226 are defined by the bottom surface 202 of the head 184. The bottom surface 202 provides a larger surface area for the bolt engagement features 260 to engage rather than the grooves 222 (shown in FIG. 3). Additionally, the grooves 222 do not need to be formed in the head 184. However, in the illustrated embodiment, the bolt 122 needs to be partially removed from the sleeve 120 to fit the bolt engagement features 260 under the bottom surface 202 of the head 184. In other various embodiments, grooves may be formed in the flange 200 at the bottom surface 202 for receiving the bolt engagement features 260 without needing to partially remove the bolt 122 from the sleeve 120 to fit the bolt extractor 130 over the tapered sleeve bolt assembly 240.

FIG. 6 is a partial sectional view of the tapered sleeve bolt removal tool 100 in accordance with an exemplary embodiment. In the illustrated embodiment, the bolt extractor 130 engages a different portion of the bolt 122. For example, the head 184 includes a threaded bore 280 at the top 206 of the head 184. The bolt extractor 130 is received in the threaded bore 280 and threadably coupled to the head 184 in the threaded bore 280. The bolt engagement features 260 are threads on a pull rod 282 of the bolt extractor 130. As the pull rod 282 is pulled in the extraction direction 132, the bolt 122 and the sleeve 120 are extracted from the components 108, 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A tapered sleeve bolt assembly comprising:
    a sleeve having a top and a bottom and having a tapered bore extending along a longitudinal axis between the top and the bottom, the sleeve having a flange at the top, the sleeve being configured to be received in an opening in a component and having a lateral dimension at the bottom sized to allow insertion of the sleeve into and removal of the sleeve from the opening;
    a bolt received in the tapered bore, the bolt having a top and a bottom with a head at the top and a threaded end at the bottom, the threaded end extending below the bottom of the sleeve for receiving a nut to secure the tapered sleeve bolt assembly to the component, the bolt having an extraction shoulder accessible from above the bolt configured to be engaged by a tapered sleeve bolt removal tool for extracting the tapered sleeve bolt assembly, wherein the bolt includes a cavity located on an outer peripheral surface of the head of the bolt below the extraction shoulder configured to receive a bolt engagement feature of the tapered sleeve bolt removal tool; and
    a stop sleeve coupled to the threaded end of the bolt for removing the sleeve from the component, the stop sleeve having a stop shoulder configured to abut against the bottom of the sleeve, the stop sleeve having a lateral dimension less than or equal to the lateral dimension of the sleeve to allow the stop sleeve to be removed through the opening in the component with the bolt and the sleeve by the tapered sleeve bolt removal tool.

2. The tapered sleeve bolt assembly of claim 1, wherein the stop sleeve is attached to the threaded end in place of the nut after the nut is removed from the threaded end.

3. The tapered sleeve bolt assembly of claim 1, wherein the head includes a bottom surface configured to engage the flange of the sleeve.

4. The tapered sleeve bolt assembly of claim 1, wherein the bolt and the sleeve are configured to be removed together from the opening in the component.

5. The tapered sleeve bolt assembly of claim 1, wherein the stop sleeve is threadably coupled to the threaded end of the bolt.

6. The tapered sleeve bolt assembly of claim 1, wherein the lateral dimension of the sleeve is a diameter, and wherein the lateral dimension of the stop sleeve is a diameter less than or equal to the diameter of the sleeve.

7. The tapered sleeve bolt assembly of claim 1, wherein the stop sleeve is configured to be axially fixed along the bolt and pulled tight against the bottom of the sleeve as the bolt is extracted by the tapered sleeve bolt removal tool.

8. The tapered sleeve bolt assembly of claim 1, wherein the stop sleeve is coupled to the bolt at a position that allows the bolt to be partially extracted from the sleeve before the stop shoulder engages the bottom of the sleeve.

9. The tapered sleeve bolt assembly of claim 1, wherein the extraction shoulder is downward facing.

10. The tapered sleeve bolt assembly of claim 1, wherein the head includes flats, at least one of the flats having a groove, the groove defines the extraction shoulder.

11. A tapered sleeve bolt removal tool comprising:
    a tapered sleeve bolt assembly including a sleeve and a bolt, the sleeve having a top and a bottom and having a tapered bore extending along a longitudinal axis between the top and the bottom, the sleeve having a flange at the top, the sleeve being configured to be received in an opening in a component and having a lateral dimension at the bottom sized to allow insertion of the sleeve into and removal of the sleeve from the opening, the bolt being received in the tapered bore, the bolt having a top and a bottom with a head at the top and a threaded end at the bottom, the threaded end extending below the bottom of the sleeve for receiving a nut to secure the tapered sleeve bolt assembly to the component, the bolt having an extraction shoulder accessible from above the bolt, the bolt including a cavity located on an outer peripheral surface of the head of the bolt below the extraction shoulder;

a stop sleeve coupled to the threaded end of the bolt for removing the sleeve from the component, the stop sleeve having a stop shoulder configured to abut against the bottom of the sleeve, the stop sleeve having a lateral dimension less than or equal to the lateral dimension of the sleeve to allow the stop sleeve to be removed through the opening in the component with the bolt and the sleeve; and a bolt extractor having a bolt engagement feature, the bolt engagement feature being receivable in the cavity to engage the extraction shoulder of the bolt, the bolt extractor being pulled in an extraction direction to pull the bolt out of the component, wherein the stop sleeve is pulled with the bolt by the bolt extractor in the extraction direction against the bottom of the sleeve to simultaneously remove the stop sleeve and the bolt from the opening in the component.

12. The tapered sleeve bolt removal tool of claim 11, wherein the stop sleeve is attached to the threaded end in place of the nut after the nut is removed from the threaded end.

13. The tapered sleeve bolt removal tool of claim 11, wherein the stop sleeve is configured to be axially fixed along the bolt and pulled tight against the bottom of the sleeve as the bolt is extracted by the tapered sleeve bolt removal tool.

14. The tapered sleeve bolt removal tool of claim 11, wherein the head includes flats, at least one of the flats having a groove, the groove defines the extraction shoulder.

15. The tapered sleeve bolt removal tool of claim 11, wherein the bolt extractor includes a base mounted to a top surface of the component, the bolt extractor including a movable member movable relative to the base to pull the bolt out of the component.

16. The tapered sleeve bolt removal tool of claim 11, wherein the bolt engagement feature includes a finger received in the cavity under the extraction shoulder, the bolt extractor including a side wall radially outward of the finger for retaining the finger in position relative to the extraction shoulder.

17. The tapered sleeve bolt removal tool of claim 11, wherein the bolt extractor includes an inner housing defining the bolt engagement feature and an outer housing radially outward of the inner housing, the inner housing moving relative to the outer housing as the inner housing is moved in the extraction direction.

18. A tapered sleeve bolt assembly configured to be received in an opening in a component, the tapered sleeve bolt assembly comprising:

a bolt configured to be received in a tapered bore of a sleeve received in the opening in the component, the bolt having a head at a top of the bolt and a shaft extending from the head, the shaft having a tapered body configured to be received in the tapered bore of the sleeve, the shaft having a threaded end at a bottom of the bolt, the threaded end is configured to extend below a bottom of the sleeve for receiving a stop sleeve;

the head of the bolt having an extraction shoulder accessible from above the bolt configured to be engaged by a tapered sleeve bolt removal tool for extracting the tapered sleeve bolt assembly from the component, the head of the bolt including a cavity located on an outer peripheral surface of the head of the bolt below the extraction shoulder configured to receive a bolt engagement feature of the tapered sleeve bolt removal tool.

19. The tapered sleeve bolt assembly of claim 18, wherein the head includes flats, at least one of the flats having a groove forming the cavity, the groove defines the extraction shoulder.

20. The tapered sleeve bolt assembly of claim 18, wherein the head includes a plurality of grooves each forming a corresponding cavity and defining a corresponding extraction shoulder.

\* \* \* \* \*